Feb. 1, 1944.   G. H. LELAND   2,340,760
APPARATUS FOR TESTING EYES
Filed April 18, 1942   3 Sheets-Sheet 1
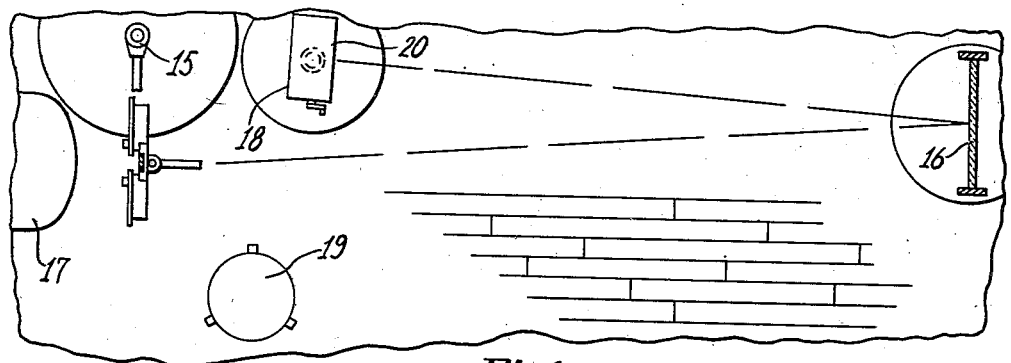
Fig.1
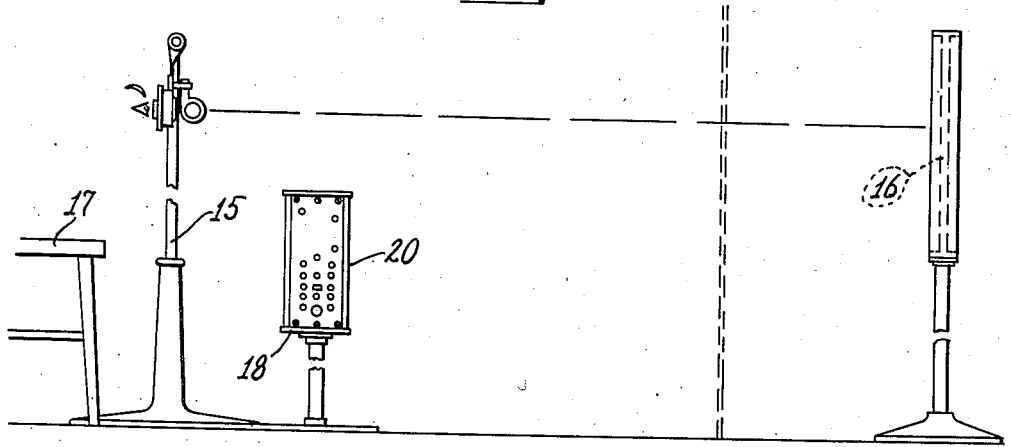
Fig.2
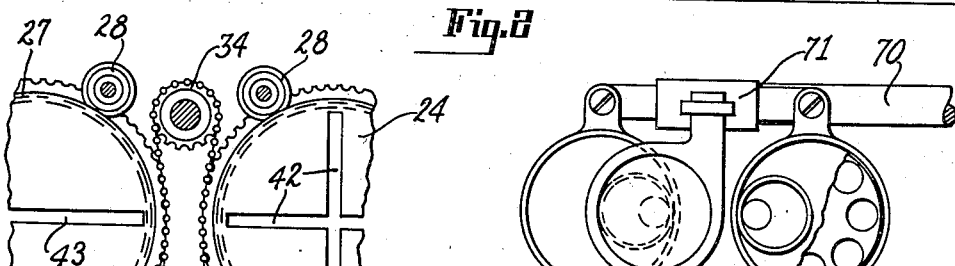
Fig.7
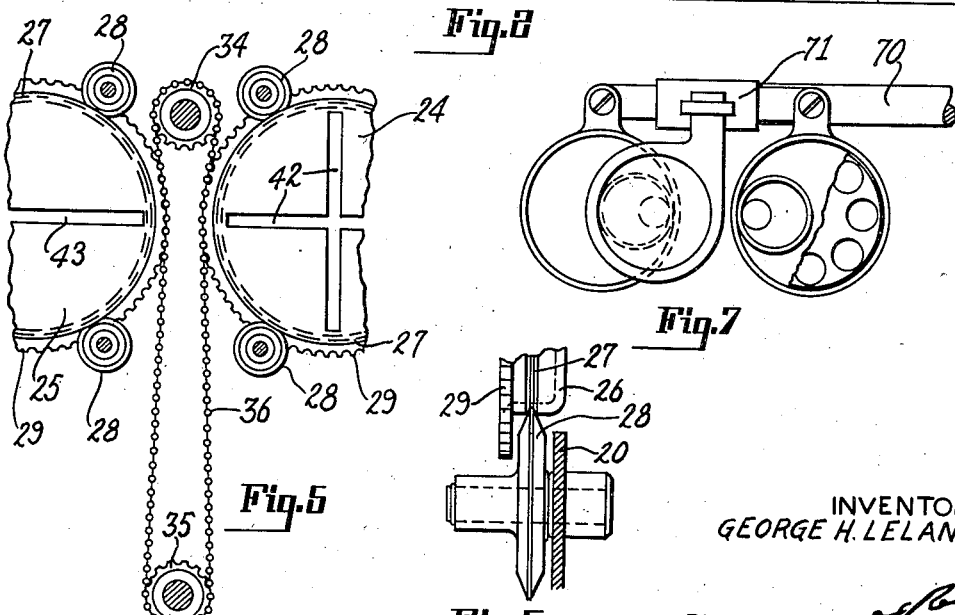
Fig.5   Fig.6
INVENTOR
GEORGE H. LELAND
BY 
ATTORNEY

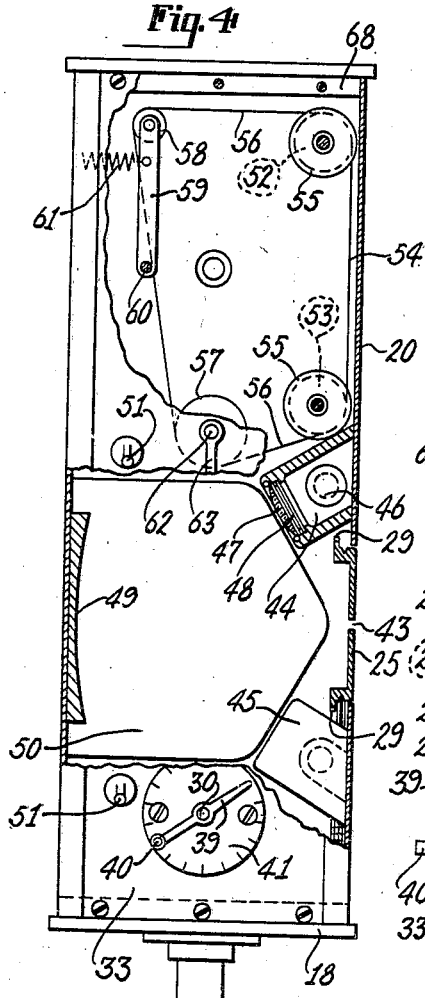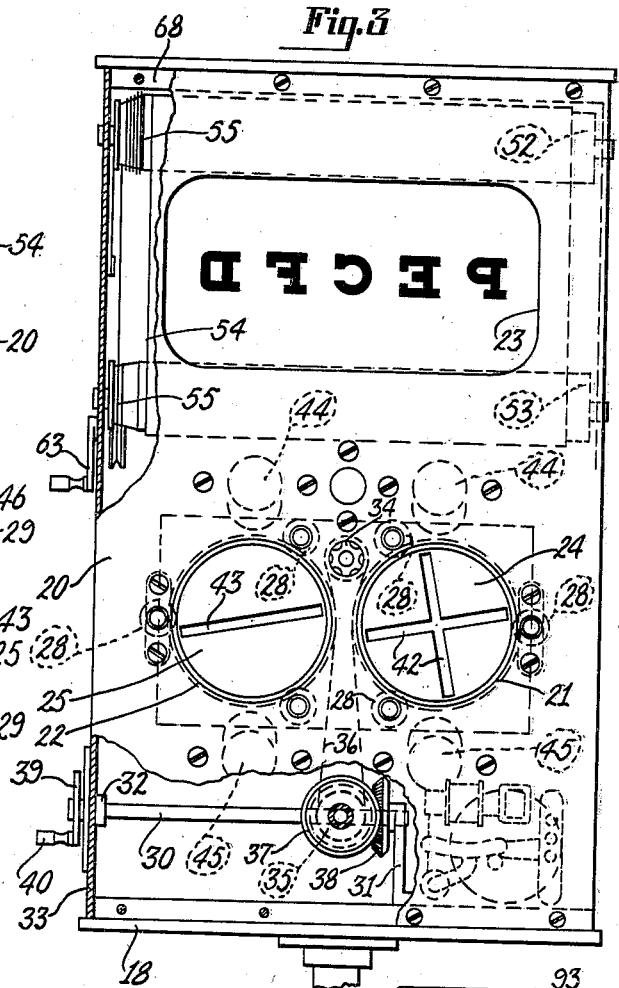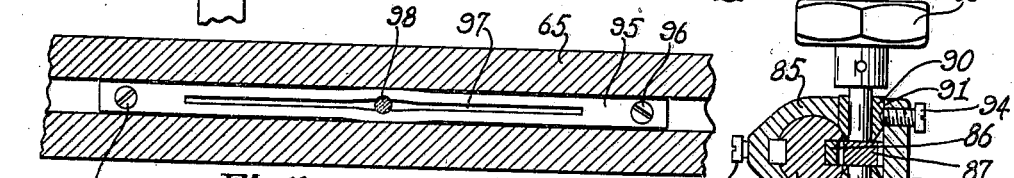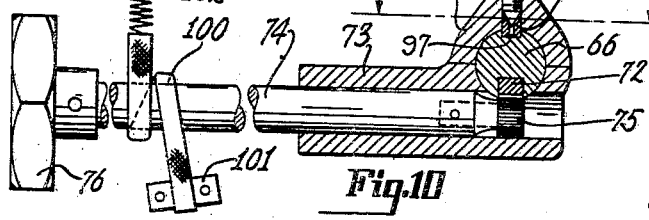

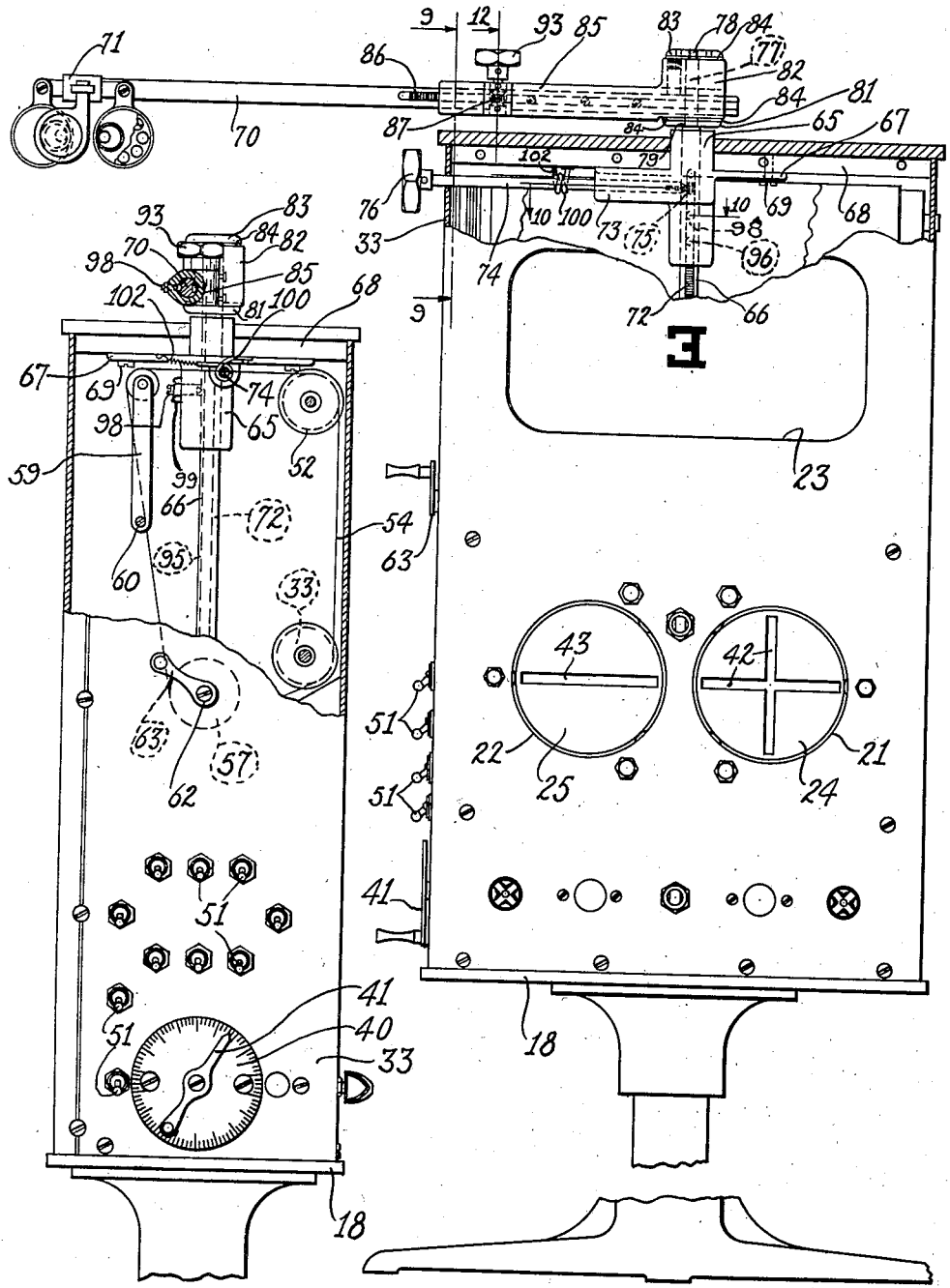

Patented Feb. 1, 1944

2,340,760

UNITED STATES PATENT OFFICE 2,340,760

APPARATUS FOR TESTING EYES

George H. Leland, Dayton, Ohio

Application April 18, 1942, Serial No. 439,501

4 Claims. (Cl. 88—29)

This invention relates to an apparatus for testing eyes and is a continuation in part of my application Serial No. 250,131, filed January 10, 1939.

One object of the invention is to provide an apparatus in which the various elements used in the examination of eyes will be arranged in a compact group and the devices for operating the respective elements will be easily accessible from the normal station of the operator or examiner.

A further object of the invention is to provide a simple and efficient mechanism for accurately adjusting a rotatable fixation object of such a character that it may be arranged in a casing or target box in which the fixation object is mounted and may be actuated from the exterior of said casing.

A further object of the invention is to provide within a casing or target box simple, easily operated means for adjustably supporting a chart, which may be actuated by a device mounted on the casing exteriorly thereof.

A further object of the invention is to combine a casing for the fixation object and a trial lens supporting structure in a unitary apparatus in which the adjusting means for the trial lens supporting structure will be carried by the casing.

A further object of the invention is to provide means operating automatically to prevent the movement of the trial lens supporting structure by gravity and which will not materially resist the upward movement of said structure by an adjusting device.

A further object of the invention is to provide a trial lens supporting structure in which a longitudinally adjustable element will be positively held against rotatory movement without interfering with the longitudinal adjustment thereof.

A further object of the invention is to provide a combined target box and trial lens supporting structure in which the devices for controlling the chart, fixation object, illuminating means and supporting structure are grouped on a single side wall of the target box.

Other objects of the invention may appear as the apparatus is described in detail.

In the accompanying drawings Fig. 1 is a schematic view showing the several parts of the apparatus in plan; Fig. 2 is a similar view showing said parts of the apparatus in elevation; Fig. 3 is a front elevation, partly broken away, of the casing or target box; Fig. 4 is a side elevation, partly in section, of the target box; Fig. 5 is a detail view of the actuating device for the fixation objects; Fig. 6 is a detail view of a portion of a fixation object and one of the supporting rollers therefor; Fig. 7 is an elevation of the trial lens support; Fig. 8 is a front elevation, partly broken away, of the target box showing the trial lens supporting structure combined therewith; Fig. 9 is a side elevation of the same with the horizontal arm of the supporting structure broken away; Fig. 10 is a section taken on the line 10—10 of Fig. 8; Fig. 11 is a sectional view of portions of the standard and vertical bearing showing the expansible key; and Fig. 12 is a transverse section taken on the line 12—12 of Fig. 8.

In Figs. 1 and 2 I have illustrated one arrangement of the units used in the examination of the eyes and have shown a trial lens supporting structure 15, of a well known type, arranged to support the trial lens in the line of vision of a patient who is facing a mirror 16, the patient's station being indicated by the chair 17. The target box, or casing containing the fixation object, is shown at 18, supported adjacent to but slightly in front of the trial lens supporting structure 15, in which position it is directly in front of and adjacent to the normal station of the operator or examiner, which is indicated by the stool 19. The fixation object is mounted in the front wall 20 of the casing and faces the mirror 16 so that the patient does not see the fixation object itself but views the same in the mirror.

The front wall 20 of the casing 18 is provided in the lower portion thereof with two openings 21 and 22, arranged side by side, and in the upper portion thereof with an opening 23. Mounted in the casing in line with and preferably extending into the openings 21 and 22 respectively, are two fixation objects 24 and 25, each provided with a sharply defined figure which, in the present instance, is adapted to be illuminated. The two fixation objects are identical except for the character of the figure and only one of them is employed at any one time, the two fixation objects being provided to enable different figures to be used successively during the examination, without the necessity of changing the figure or removing one fixation object and substituting another. Each fixation object is circular in form and comprises a cylindrical portion 26 having an exterior circumferential groove 27. Mounted within the casing and preferably on the front wall 20 thereof are a plurality of rollers 28 which are spaced about the corresponding opening in the wall of the casing and each of which has a tapered peripheral portion which enters the groove 27 in the fixation object, the rollers thus serving to support the fixation object for rotation about a fixed axis and to prevent the axial displacement thereof. Rigidly secured to the inner end of the cylindrical portion 26 is an annular gear 29, here shown as a sprocket gear, and this annular gear is connected by suitable gearing with a shaft 30 journaled in a bracket 31 and in a bearing 32 in the side wall 33 of the casing. In the present arrangement sprocket gears 34 and 35 are arranged respectively above and below the horizontal plane of the axes of the two fixation members and a sprocket chain 36 extending about the sprocket gears 34 and 35 has its oppositely moving stretches in engagement with the respective annular gears, thereby causing those gears and the fixation objects to rotate in the same direction. Rigidly secured to the lower sprocket gear 35 is a beveled gear 37 which meshes with a beveled gear 38 secured to the shaft 30 so that the rotation of the shaft 30 will actuate both fixation objects. That end of the shaft 30 which extends beyond the side wall 33 has secured thereto an actuating device here shown in the form of a pointer 39 having attached thereto a handle 40, the pointer moving over a graduated dial 41. The ratio of the gearing between the shaft 30 and the fixation objects is preferably four to one so that a full rotation of the shaft 30 will rotate each of the fixation objects through an arc of ninety degrees, thereby permitting a relatively wide spacing of the graduations on the dial 41 and enabling fine adjustments of the fixation objects to be made. Inasmuch as the patient views the fixation object in the mirror only it is desirable that the figure as it appears in the mirror should rotate in the same direction as the pointer 39 and the arrangement of the gearing is such that the fixation objects will rotate in a direction opposite the direction of rotation of the pointer and therefore the reflection in the mirror will rotate in the same direction as the pointer.

In the construction here shown the sharp line figures of the fixation objects are in the nature of slots 42 and 43 which are to be illuminated by light directed thereon from the rear thereof, and when used in the preferred form of the method described in the above mentioned application they are illuminated alternately with a bright light and a dim light polarized on different axes. As here shown light projectors 44 and 45 are arranged respectively above and below each fixation object, each projector being provided with a lamp 46, a lens 47 and a light polarizing element 48. The light from the lamps is projected onto the screen 49 which diffuses the light and deflects the same onto the fixation objects. A vertical partition 50 arranged between the two pairs of projectors confines the light from each pair to the fixation object with which that pair is associated. Suitable means are provided within the casing to control the illumination of the fixation objects, to control the means for effecting alternate illumination, such as a flasher, and to otherwise control the illumination, and these controlling means are provided with individual switches the actuating members of which are mounted on the side wall 33 of the casing, as shown at 51 in Figs. 4 and 9. The particular means for controlling the illumination forms no part of the present invention and need not be here illustrated or described in detail, the same being fully described in the above mentioned application.

Two rollers 52 and 53 are mounted in the upper portion of the casing above and below the opening 23 in the wall thereof and an elongate chart 54 has its end portions secured to and wound about the respective rollers, with the intermediate portion thereof extending across the opening 23. This chart is provided with suitable symbols, letters or the like spaced apart lengthwise thereof so that the winding of the chart onto and off of the rollers will move different symbols or letters into line with the opening. Each roller is provided at one end thereof with a pulley and, in the present instance, the ends of the rollers are shaped to provide those pulleys, as shown at 52. A cable 56 has its end portions secured to and wound about the respective pulleys and has its intermediate portion wound about an operating pulley 57 arranged in the rear of the pulley 55 on the lower roller and about a tension pulley 58 which, as here shown, is carried by an arm 59 pivotally mounted on the casing at 60 and acted upon by a spring 61 to maintain the cable and the chart taut. The actuating pulley 57 is mounted on a shaft 62 which extends through the side wall 33 and has secured thereto an operating device, such as a handle 63. Thus the operation of the handle 63 in either direction will cause the chart to be wound onto and off of the respective pulleys.

As shown in Figs. 1 and 2 the trial lens supporting structure, or phoroptor, is entirely separate from the casing or target box but I prefer to combine these units into a unitary structure which can be much more conveniently operated and is more compact than the separate structures. Such a combined structure is illustrated in Figs. 8 and 9 where there is shown a vertical tubular member 65 mounted in the upper portion of the casing 18 and constituting a bearing in which the vertical standard 66 of the trial lens supporting structure is slidably mounted. The bearing may be mounted in any suitable manner but, as here shown, it is provided between its ends with a radial flange 67 which is rigidly secured to the inner side of the top wall 68 of the casing by screws 69. That portion of the bearing above the flange extends through an opening in the top wall and the lower portion of the bearing extends for a substantial distance below the flange. The standard 66 extends above the top wall of the casing and is provided with means for supporting thereon an arm 70 which carries a trial lens support 71. This trial lens support is of a known construction and forms no part of the present invention. The standard 66 is provided with a longitudinal series of teeth which are here shown in the form of a toothed rack 72 rigidly mounted in a longitudinal recess in one side of the standard. Rigidly mounted adjacent the vertical bearing 65, and preferably formed integral therewith, is a horizontal or transverse bearing 73 in which is rotatably mounted a shaft 74 having at its inner end a pinion 75 which meshes with the teeth on the standard. The shaft 74 extends through the side wall 33 of the casing and is provided on its outer end with an actuating device, such as a knob 76. Thus the rotation of the shaft 74 by its actuating device will impart vertical movement to the standard 76 to enable the trial lens support 71 to be positioned at the proper elevation with relation to the eyes of the patient. It is also desirable that the arm 70 should be adjustable both longitudinally and transversely to its length to properly position the trial lens support and for this purpose it is mounted on the upper end of the standard for longitudinal adjustment transversely to that standard and for rotary adjustment about the axis of that standard. In the illustrated construction the upper portion of the standard, which extends above the bearing 65, is of reduced diameter, as shown at 77, and the extreme upper end of this reduced portion is screw threaded as shown at 78. A plate 81 is supported on the shoulder 79 formed at the lower end of the reduced portion 77 of the standard and a vertical bearing 82 is mounted on said reduced portion and supported by the plate 81. The second plate 83 is screw threaded onto the upper end of the reduced portion 77 of the standard to retain the bearing 82 thereon. A friction disk 84 is introduced between the plate 81 and the lower end of the bearing 82 and by properly adjusting the upper plate 83 the frictional contact between the bearing and the friction disk may be so adjusted as to retain the bearing 82 against rotation until substantial rotative force is applied thereto. Rigidly connected with the vertical bearing 82 and preferably formed integral therewith is a horizontal, or transverse, bearing 85 in which the rod 70 is slidably mounted. This rod is also provided with a longitudinal series of teeth 86 with which meshes a pinion 87 carried by a shaft 88 journaled in bearings 89 and 90 mounted in openings 91 and 92 in a laterally projecting part of the bearing structure 85, the shaft having secured at one end thereof an actuating device, such as a knob 93. To facilitate the mounting of this pinion unit on the bearing 85 it is preferable that the several parts thereof should be assembled before any part of the unit is mounted in the openings 91 and 92. For this purpose at least one of the bearings 89 and 90, that is the bearing 90 adjacent the knob, is made separate from the structure 85 and is adapted to be inserted in its opening 91 after it has been mounted on the shaft 88. This bearing is of a diameter at least equal to the diameter of the pinion 87, so that the pinion may pass through the opening 91 prior to the insertion of the bearing 90 therein. In the present instance both bearings are separate from the structure 85 and are of equal diameters, and after the pinion unit has been fully assembled the bearing 89, on that end of the shaft 88 opposite the knob 93, and the pinion may be passed through the opening 91 and the two bearings then inserted in their respective openings and rigidly secured therein, as by set screws 94.

Both the standard 66 and the arm 70 are cylindrical in form and are held against rotation in their respective bearings by keys, or splines, but it is difficult to provide a key which will prevent all rotatory movement of the cylindrical element without frictional resistance which will retard the adjustment thereof. I have therefore provided a special form of key for the standard and rod which will positively prevent any rotary movement thereof without offering material resistance to the longitudinal adjustment thereof. The keys for the standard and the rod are identical and in Figs. 10 and 11 I have illustrated the key for the standard. As there shown, the bearing 65 and the standard 66 are provided with opposed longitudinal grooves, the groove in the standard constituting a keyway. A key 95 of substantial length is mounted in the groove in the bearing 65 and is rigidly secured therein adjacent its ends, as by screws 96, and extends into the keyway in the standard. A slot 97 extends through the key for the major portion of its length but has its ends spaced from the ends of the key. Mounted in the bearing 65 is an expanding device, such as a screw 98 having a tapered inner end adapted to enter the slot 97 in the key. By adjusting the screw the lateral portions of the key adjacent to the screw may be moved laterally into snug running fit with the side walls of the keyway in the standard so as to positively prevent any rotary movement of the standard but due to the short length of the expanded portions of the key this contact does not materially resist the longitudinal adjustment of the standard. When the proper adjustment has been effected the screw is locked in its adjusted position, as by means of a lock nut 99.

The trial lens supporting structure has considerable weight and there may be a tendency for the standard 66, after having been adjusted, to move downward by gravity and thus displace the trial lens support. To prevent this and maintain accurate adjustment I have provided a device which operates automatically to prevent the downward movement of the standard by gravity but which will offer little or no resistance to the upward movement of the standard by its acuating device. In the form here shown this device comprises an elongate flexible element, such as a section of cable 100, which is wound about the shaft 74 for one or more convolutions, and one end of which is rigidly secured to the top wall 68 of the casing, as by means of a clip 101. The other end of the flexible element is connected with the top wall of the casing by means of a spring 102. The flexible element is wound about the shaft in such a direction that any tendency of the shaft 74 to rotate under the influence of a downward force exerted thereon by the standard will exert a pull on the anchored end of the flexible element which will cause the latter to be drawn tightly about the shaft and thus exert on the latter a braking force sufficient to overcome the action of gravity on the standard. However, this braking action is not sufficient to prevent the rotation of the shaft by the actuating device in a direction to move the standard downwardly. When the shaft 74 is rotated by the actuating device 76 in a direction to elevate the standard the flexible member is caused to exert a pull on the spring 102 which yields so as to permit the relatively free rotation of the shaft, the flexible element then offering very little resistance to the rotation of the shaft.

While I have illustrated certain embodiments of my invention I wish it to be understood that I do not desire to be limited to the details thereof as various modifications may occur to a person skilled in the art.

Having now fully described my invention, what I claim as new and desire to secure by Letters Patent, is:

1. In an eye testing apparatus including means for supporting a trial lens in the line of vision of the eye to be tested, and a mirror spaced from and facing the lens on said supporting means, a casing adjacent said lens supporting means, two fixation objects mounted in said casing for rotation about fixed axes and facing said mirror, each fixation object having a part provided with peripheral teeth, a shaft rotatably mounted in said casing and extending through a wall thereof, a sprocket wheel mounted in said casing below the horizontal plane of the axes of said fixation objects and operatively connected with said shaft, a second sprocket wheel mounted in said casing above said plane, a sprocket chain extending about said sprocket wheels and having its oppositely moving stretches in engagement with the teeth of the respective fixation objects, an actuating device connected with said shaft exteriorly of and adjacent to said wall, means associated with said shaft to indicate the positions of said fixation objects, means for separately illuminating said fixation objects, and means mounted exteriorly of said casing adjacent said actuating devices to selectively control said illuminating means.

2. In an eye testing apparatus including means for supporting a trial lens in the line of vision of the eye to be tested and a mirror spaced from and facing the lens on said supporting means, a casing adjacent said lens supporting means, two fixation objects mounted in said casing for rotation about fixed axes and facing said mirror, a shaft rotatably mounted in said casing and extending through a wall thereof, gearing connecting said shaft with said fixation objects to rotate the latter in synchronism, said gearing being of such ratio that a complete rotation of said shaft will impart a partial rotation only to said fixation objects, a fixed dial mounted about said shaft on the outer side of said wall and having a circumferential series of graduations, an indicator mounted on said shaft for movement over said graduations, and an actuating device connected with the outer end portion of said shaft.

3. In an eye testing apparatus of the character described, a casing for a fixation object, a vertical bearing mounted in the upper portion of said casing, a standard slidably mounted in said bearing, extending above the top wall of said casing and having a longitudinal series of teeth, a laterally extending structure mounted on the upper portion of said standard to support thereon a trial lens support, a horizontal bearing mounted in said casing in fixed relation to said bearing, a shaft mounted in said horizontal bearing, a pinion secured to said shaft and meshing with the teeth on said standard, means for rotating said shaft, and means acting on said shaft to resist the rotation thereof by the downward thrust of said standard while permitting the free rotation of said shaft by said rotating means in a direction to elevate said standard.

4. In an eye testing apparatus of the character described, a casing for a fixation object, a vertical bearing mounted in said casing, a standard slidably mounted in said bearing, means carried by said standard for supporting thereon a trial lens support, means operable from the exterior of said casing for moving said standard longitudinally in said bearing, said standard and said bearing having opposed longitudinal grooves, an elongate key mounted in the groove in said bearing, extending into the groove in said standard and having between the ends thereof a slot of substantial length, means beyond the respective ends of said slot for securing said key to said bearing, a screw mounted in said bearing and having a tapered end portion extending into the intermediate portion of said slot and operable to expand said intermediate portion of said key into snug running contact with the side walls of the groove in said standard.

GEORGE H. LELAND.